(12) United States Patent
Ben Dayan et al.

(10) Patent No.: US 11,755,252 B2
(45) Date of Patent: *Sep. 12, 2023

(54) EXPANDING A DISTRIBUTED STORAGE SYSTEM

(71) Applicant: Weka.IO Ltd, Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL)

(73) Assignee: Weka.IO Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/497,138

(22) Filed: Oct. 8, 2021

(65) Prior Publication Data

US 2022/0027053 A1 Jan. 27, 2022

Related U.S. Application Data

(63) Continuation of application No. 16/274,600, filed on Feb. 13, 2019, now Pat. No. 11,169,746.

(60) Provisional application No. 62/686,956, filed on Jun. 19, 2018.

(51) Int. Cl.
  *G06F 3/06* (2006.01)

(52) U.S. Cl.
  CPC ............ *G06F 3/067* (2013.01); *G06F 3/0614* (2013.01); *G06F 3/0644* (2013.01); *G06F 3/0683* (2013.01)

(58) Field of Classification Search
  CPC ...... G06F 3/067; G06F 3/0614; G06F 3/0644; G06F 3/0683; G06F 3/0617; G06F 3/061; G06F 3/0631; G06F 3/0619; G06F 3/0688
  See application file for complete search history.

(56) References Cited

U.S. PATENT DOCUMENTS

| | | |
|---|---|---|
| 6,487,636 B1 | 11/2002 | Dolphin et al. |
| 7,373,366 B1 | 5/2008 | Chatterjee |
| 7,447,839 B2 | 11/2008 | Uppala |
| 7,681,072 B1 | 3/2010 | Gibson et al. |
| 7,793,146 B1 | 9/2010 | Gibson et al. |
| 8,645,749 B2 | 2/2014 | Reche |

(Continued)

FOREIGN PATENT DOCUMENTS

WO  2017192917 A  11/2017

OTHER PUBLICATIONS

Int'l Search Report and Written Opinion Appln No. PCT/IB2016/001177 dated Dec. 2, 2016.

(Continued)

*Primary Examiner* — Francisco A Grullon
(74) *Attorney, Agent, or Firm* — McAndrews, Held & Malloy, Ltd.

(57) ABSTRACT

A plurality of computing devices are communicatively coupled to each other via a network, and each of the plurality of computing devices is operably coupled to one or more of a plurality of storage devices. A plurality of failure resilient stripes is distributed across the plurality of storage devices such that each of the plurality of failure resilient stripes spans a plurality of the storage devices. The plurality of computing devices maintains each failure resilient stripe using a bucket. These buckets are operably split and transferred between the computing devices to balance available computing power and storage access.

16 Claims, 7 Drawing Sheets

(56) References Cited

U.S. PATENT DOCUMENTS

| | | | |
|---|---|---|---|
| 8,918,478 B2 | 12/2014 | Ozzie et al. | |
| 9,087,012 B1 | 7/2015 | Hayes et al. | |
| 9,448,887 B1 | 9/2016 | Ben Dayan et al. | |
| 10,430,279 B1* | 10/2019 | Dittia | G06F 3/0656 |
| 11,138,103 B1* | 10/2021 | Shi | G06F 3/0619 |
| 2007/0260842 A1 | 11/2007 | Faibish et al. | |
| 2007/0294565 A1 | 12/2007 | Johnston et al. | |
| 2010/0199125 A1 | 8/2010 | Reche | |
| 2010/0281214 A1 | 11/2010 | Jernigan, IV | |
| 2013/0311706 A1 | 11/2013 | Okada et al. | |
| 2014/0025770 A1* | 1/2014 | Warfield | G06F 16/256 709/213 |
| 2015/0355971 A1 | 12/2015 | Becker-Szendy et al. | |
| 2016/0094401 A1 | 3/2016 | Anwar et al. | |
| 2016/0246677 A1 | 8/2016 | Sangamkar et al. | |
| 2017/0097775 A1 | 4/2017 | Ben Dayan et al. | |
| 2017/0185304 A1 | 6/2017 | Curtis-Maury et al. | |
| 2017/0206136 A1 | 7/2017 | Hayes et al. | |
| 2017/0238176 A1 | 8/2017 | Garcia Morchon et al. | |
| 2017/0337002 A1 | 11/2017 | Davis et al. | |
| 2018/0046581 A1 | 2/2018 | Banerjee et al. | |
| 2019/0026033 A1* | 1/2019 | Simionescu | G06F 12/0868 |
| 2019/0042407 A1* | 2/2019 | Gao | G06F 3/0688 |
| 2019/0114108 A1* | 4/2019 | Trika | G06F 3/0635 |
| 2019/0114114 A1* | 4/2019 | Trika | H03M 13/154 |
| 2020/0133809 A1* | 4/2020 | Han | G06F 3/0619 |
| 2021/0073123 A1* | 3/2021 | Huang | G06F 3/0644 |
| 2021/0109664 A1* | 4/2021 | Shang | G06F 3/0689 |
| 2021/0349649 A1* | 11/2021 | Lee | G06F 3/0632 |
| 2022/0011955 A1* | 1/2022 | Juch | G06F 3/0632 |
| 2022/0261170 A1* | 8/2022 | Vohra | G06F 3/061 |
| 2022/0269601 A1* | 8/2022 | Monteith | G06F 3/0643 |

OTHER PUBLICATIONS

Int'l Search Report and Written Opinion Appln No. PCT/IB2019/000731 dated Mar. 25, 2020.

Appleyard et al. "First Experiences with CEPH on the WLCG Grid." In: International Symposium on Grids and Clouds (ISGC). Mar. 22, 2013 (Mar. 22, 2013) Retrieved on Mar. 4, 2020 (Mar. 4, 2020) from <https:llpos.sissa.it/210/037/pdf> entire document.

Int'l Preliminary Report on Patentability Appln No. PCT/IB2019/000731 dated Dec. 30, 2020.

European Office Communication with Supplementary European Search Report Appln. No. 19822742 dated Mar. 1, 2022.

European Office Communication with extended European Search Report Appln No. 19822742.3 dated Jun. 14, 2022.

* cited by examiner

EXPANDING A DISTRIBUTED STORAGE SYSTEM

PRIORITY CLAIM

This application is a continuation of U.S. patent application Ser. No. 16/274,600 filed, Feb. 13, 2019, which claims priority to U.S. provisional patent application 62/686,956, filed on Jun. 19, 2018. The aforementioned applications are each hereby incorporated herein by reference in their entirety.

BACKGROUND

Limitations and disadvantages of conventional approaches to data storage will become apparent to one of skill in the art, through comparison of such approaches with some aspects of the present method and system set forth in the remainder of this disclosure with reference to the drawings.

INCORPORATION BY REFERENCE

U.S. patent application Ser. No. 15/243,519 titled "Distributed Erasure Coded Virtual Filesystem" is hereby incorporated herein by reference in its entirety.

BRIEF SUMMARY

Methods and systems are provided for expanding a distributed filesystem substantially as illustrated by and/or described in connection with at least one of the figures, as set forth more completely in the claims.

DETAILED DESCRIPTION

Traditionally, filesystems use a centralized control over the metadata structure (e.g., directories, files, attributes, file contents). If a local filesystem is accessible from a single server and that server fails, the filesystem's data may be lost if as there is no further protection. To add protection, some filesystems (e.g., as provided by NetApp) have used one or more pairs of controllers in an active-passive manner to replicate the metadata across two or more computers. Other solutions have used multiple metadata servers in a clustered way (e.g., as provided by IBM GPFS, Dell EMC Isilon, Lustre, etc.). However, because the number of metadata servers in a traditional clustered system is limited to small numbers, such systems are unable to scale.

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB blocks and 128 MB chunks. Extents may be stored in volatile memory, e.g., RAM for fast access, backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the filesystem's namespace, this load can be distributed across a plurality of nodes.

Figure 1:
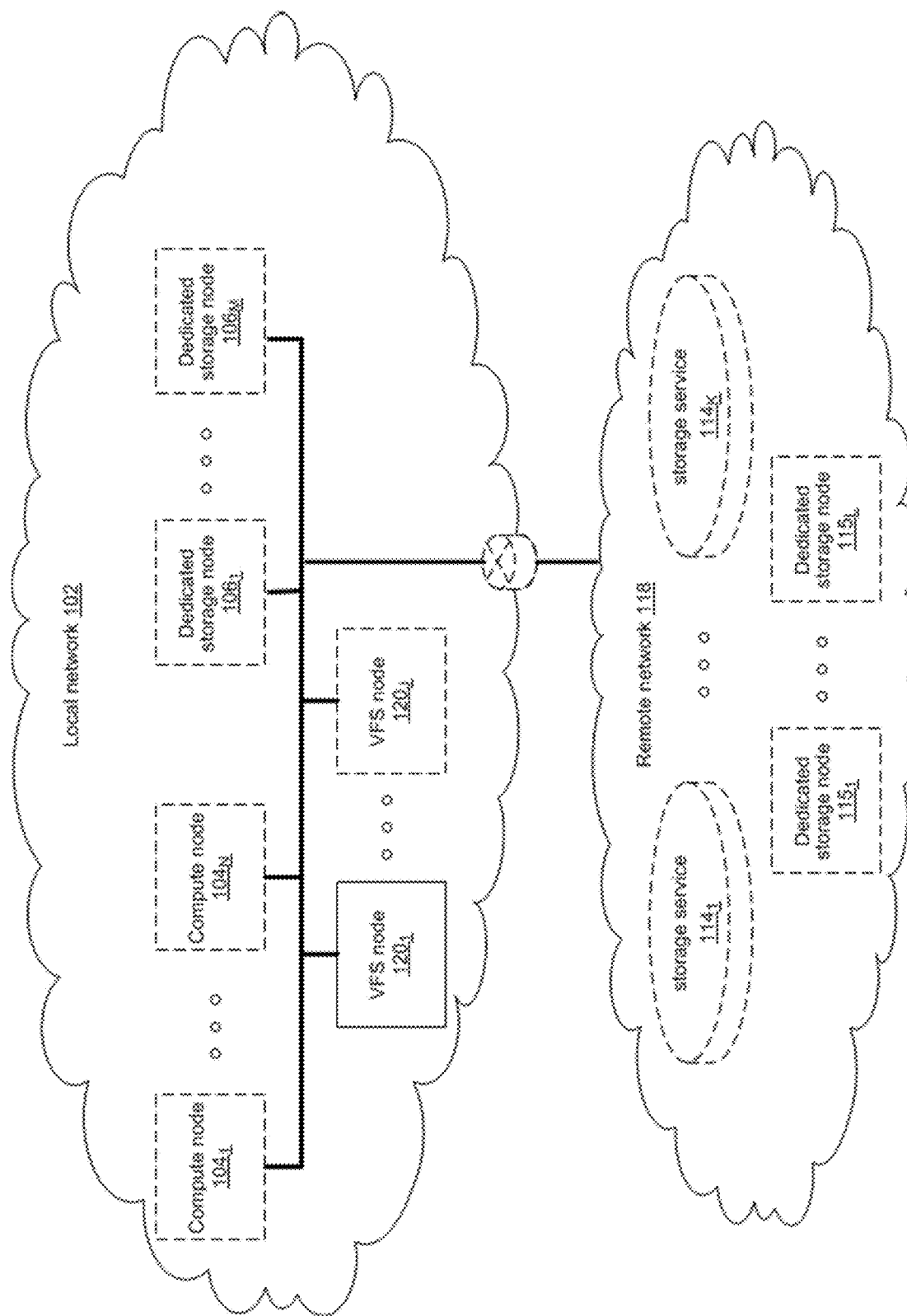
FIG. 1 illustrates various example configurations of a distributed filesystem in accordance with aspects of this disclosure.

FIG. 1 illustrates various example configurations of a distributed filesystem in accordance with aspects of this disclosure. Shown in FIG. 1 is a local area network (LAN) 102 comprising one or more nodes 120 (indexed by integers from 1 to J, for j≥1), and optionally comprising (indicated by dashed lines): one or more dedicated storage nodes 106 (indexed by integers from 1 to M, for M≥1), one or more compute nodes 104 (indexed by integers from 1 to N, for N≥1), and/or an edge router that connects the LAN 102 to a remote network 118. The remote network 118 optionally comprises one or more storage services 114 (indexed by integers from 1 to K, for K≥1), and/or one or more dedicated storage nodes 115 (indexed by integers from 1 to L, for L≥1).

Each node $120_j$ (j an integer, where 1≤j≤1) is a networked computing device (e.g., a server, personal computer, or the like) that comprises circuitry for running processes (e.g., client processes) either directly on an operating system of the device $104_n$ and/or in one or more virtual machines running in the device $104_n$.

The compute nodes 104 are networked devices that may run a virtual frontend without a virtual backend. A compute node 104 may run a virtual frontend by taking a single root input/output virtualization (SR-IOV) into the network interface card (NIC) and consuming a complete processor core. Alternatively, the compute node 104 may run the virtual frontend by routing the networking through a Linux kernel networking stack and using kernel process scheduling, thus not having the requirement of a full core. This is useful if a user does not want to allocate a complete core for the filesystem or if the networking hardware is incompatible with the filesystem requirements.

Figure 2:
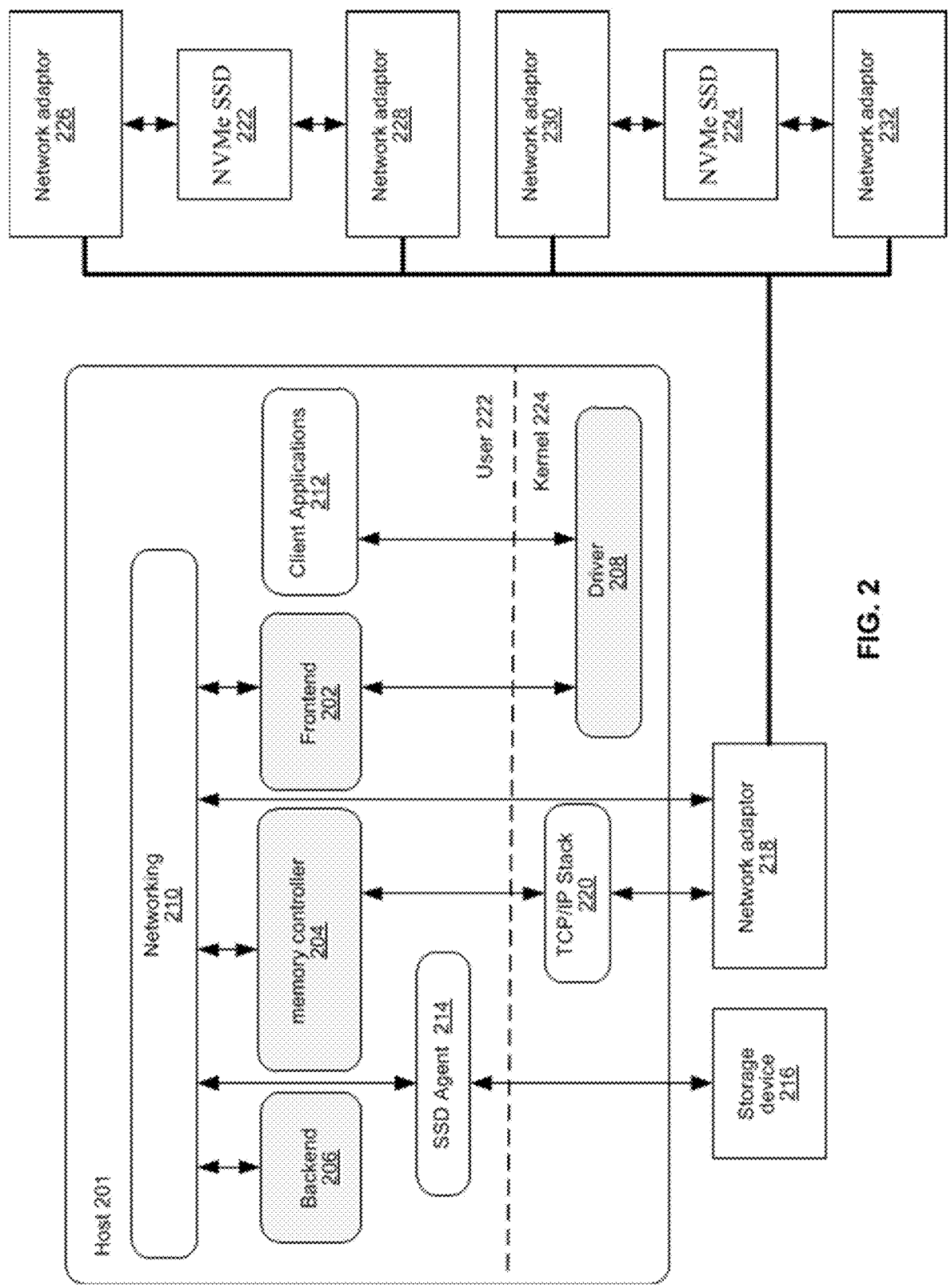
FIG. 2 illustrates an example configuration of a distributed filesystem node in accordance with aspects of this disclosure.

FIG. 2 illustrates an example configuration of a node in accordance with aspects of this disclosure. A node comprises a frontend 202 and driver 208, a memory controller 204, a backend 206, and an SSD agent 214. The frontend 202 may be a virtual frontend; the memory controller 204 may be a virtual memory controller; the backend 206 may be a virtual backend; and the driver 208 may be a virtual drivers. As used in this disclosure, a virtual filesystem (VFS) process is a process that implements one or more of: the frontend 202, the memory controller 204, the backend 206, and the SSD agent 214. Thus, in an example implementation, resources (e.g., processing and memory resources) of the node may be shared among client processes and VFS processes. The processes of the VFS may be configured to demand relatively small amounts of the resources to minimize the impact on the performance of the client applications. The frontend 202, the memory controller 204, and/or the backend 206 and/or the SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual filesystem is independent of the particular physical machine(s) on which the VFS process(es) are running. Client processes only require driver 208 and frontend 202 to be present in order to serve them.

The node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The node may be serviced by an operating system and/or a virtual machine monitor (VMM) (e.g., a hypervisor). The VMM may be used to create and run the node on a host 201. Multiple cores may reside inside the single LXC container running the VFS, and the VFS may run on a single host 201 using a single Linux kernel. Therefore, a single host 201 may comprise multiple frontends 202, multiple memory controllers 204, multiple backends 206, and/or one or more drivers 208. A driver 208 may run in kernel space outside the scope of the LXC container.

A SR-IOV PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage device 216 attached via a PCI Express (PCIe) bus. The non-volatile storage device 220 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD 216 with the SSD agent 214 and networking 210. Alternatively, the SSD may be implemented as a network-attached NVMe SSD 242 or 244 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 242 and 244 to transform them into networked NVMe-oF devices without the use of a server. The NVMe SSDs 242 and 244 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by sharding the frontend based on the ID of the file or directory. The VFS frontend 202 provides an interface for routing filesystem requests to an appropriate VFS backend based on the bucket that is responsible for that operation. The appropriate VFS backend may be on the same host or it may be on another host.

A VFS backend 206 hosts several buckets, each one of them services the filesystem requests that it receives and carries out tasks to otherwise manage the virtual filesystem (e.g., load balancing, journaling, maintaining metadata, caching, moving of data between tiers, removing stale data, correcting corrupted data, etc.)

A VFS SSD agent 214 handles interactions with a respective storage device 216. This may include, for example, translating addresses, and generating the commands that are issued to the storage device (e.g., on a SATA, SAS, PCIe, or other suitable bus). Thus, the VFS SSD agent 214 operates as an intermediary between a storage device 216 and the VFS backend 206 of the virtual filesystem. The SSD agent 214 could also communicate with a standard network storage device supporting a standard protocol such as NVMe-oF (NVMe over Fabrics).

Figure 3:
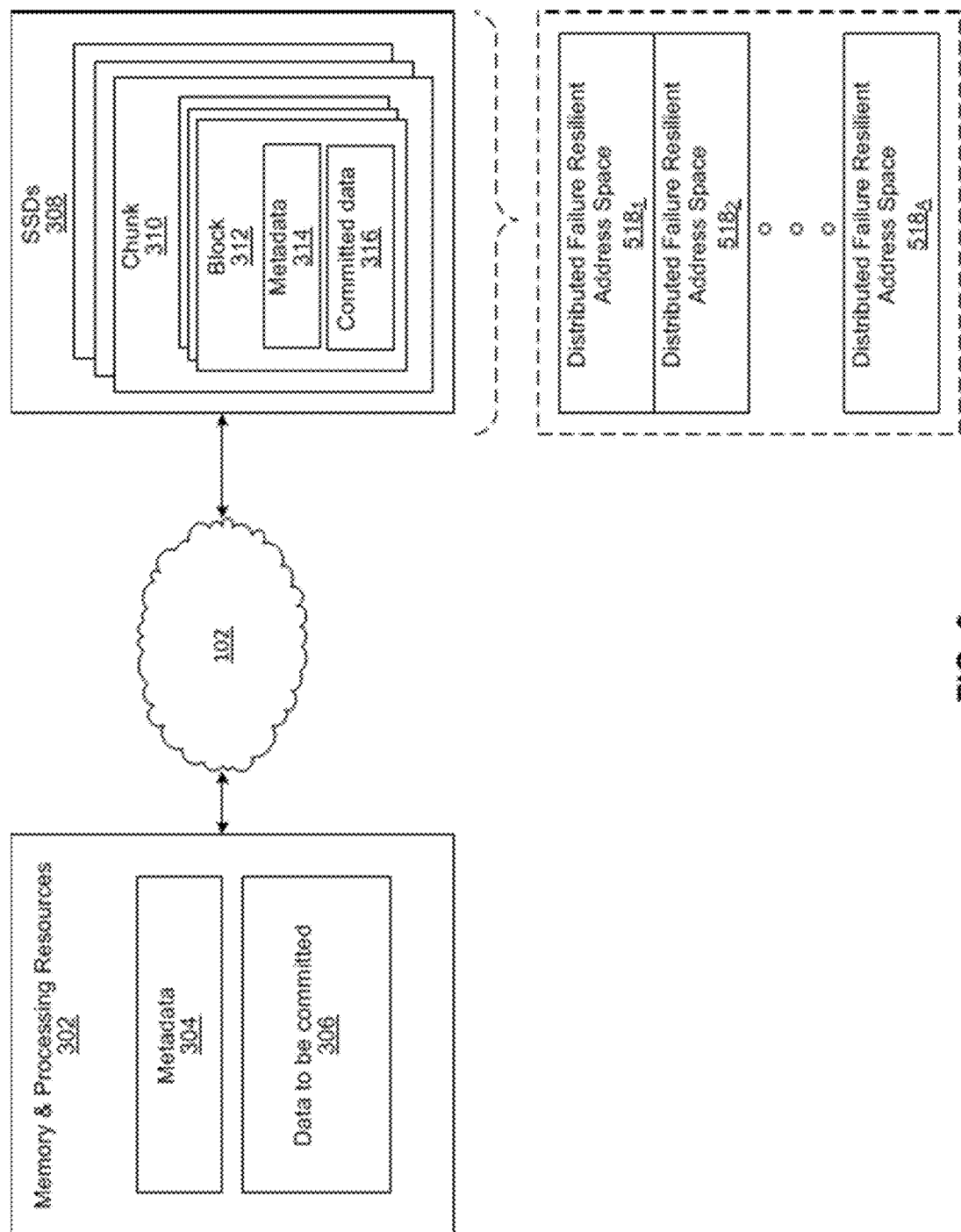
FIG. 3 illustrates another representation of a distributed filesystem in accordance with an example implementation of this disclosure.

FIG. 3 illustrates another representation of a distributed filesystem in accordance with an example implementation of this disclosure. In FIG. 3, the element 302 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual filesystem, such as described regarding FIG. 2 above. The element 308 represents the one or more physical storage devices 216 which provide the long term storage of the virtual filesystem.

As shown in FIG. 3, the physical storage is organized into a plurality of distributed failure resilient address spaces (DFRASs) 318. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual filesystem (e.g., all nodes $104_1$-$104_N$, $106_1$-$106_M$, and $120_1$-$120_J$ of FIG. 1 may perform concurrent commits in parallel). In an example implementation, each of the nodes of the virtual filesystem may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re]assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire filesystem metadata space (e.g., directory, file attributes, content range in the file, etc.) can be broken (e.g., chopped or sharded) into small, uniform pieces (e.g., "shards"). For example, a large system with 30 k servers could chop the metadata space into 128 k or 256 k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8 k buckets.

Each bucket may be active on a small set of nodes, typically 5 nodes that that form a penta-group for that bucket. The cluster configuration keeps all participating nodes up-to-date regarding the penta-group assignment for each bucket.

Each penta-group monitors itself. For example, if the cluster has 10 k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than 64,000

$$\left( \frac{26!}{5! * (26-5)!} \right)$$

possible five-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the filesystem. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Since each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 518) and does not need to cooperate with other buckets to perform read or write operations. There are potentially thousands of concurrent, distributed erasure coding instances working concurrently, each for the different bucket. This is an integral part of scaling performance, as it effectively allows any large filesystem to be divided into independent pieces that do not need to be coordinated, thus providing high performance regardless of the scale.

Each bucket handles all the filesystems operations that fall into its shard. For example, the directory structure, file attributes and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

If the cluster of size is small (e.g., 5) and penta-groups are used, there will be buckets that share the same group. As the cluster size grows, buckets are redistributed such that no two groups are identical.

A storage system may be expanded by adding more compute power and by adding more storage capacity. More compute power will support more metadata operations and TOPS. When expanding computational power, the user may choose to add new servers with more cores or may decide to allocate more cores running on current servers.

Figure 4:
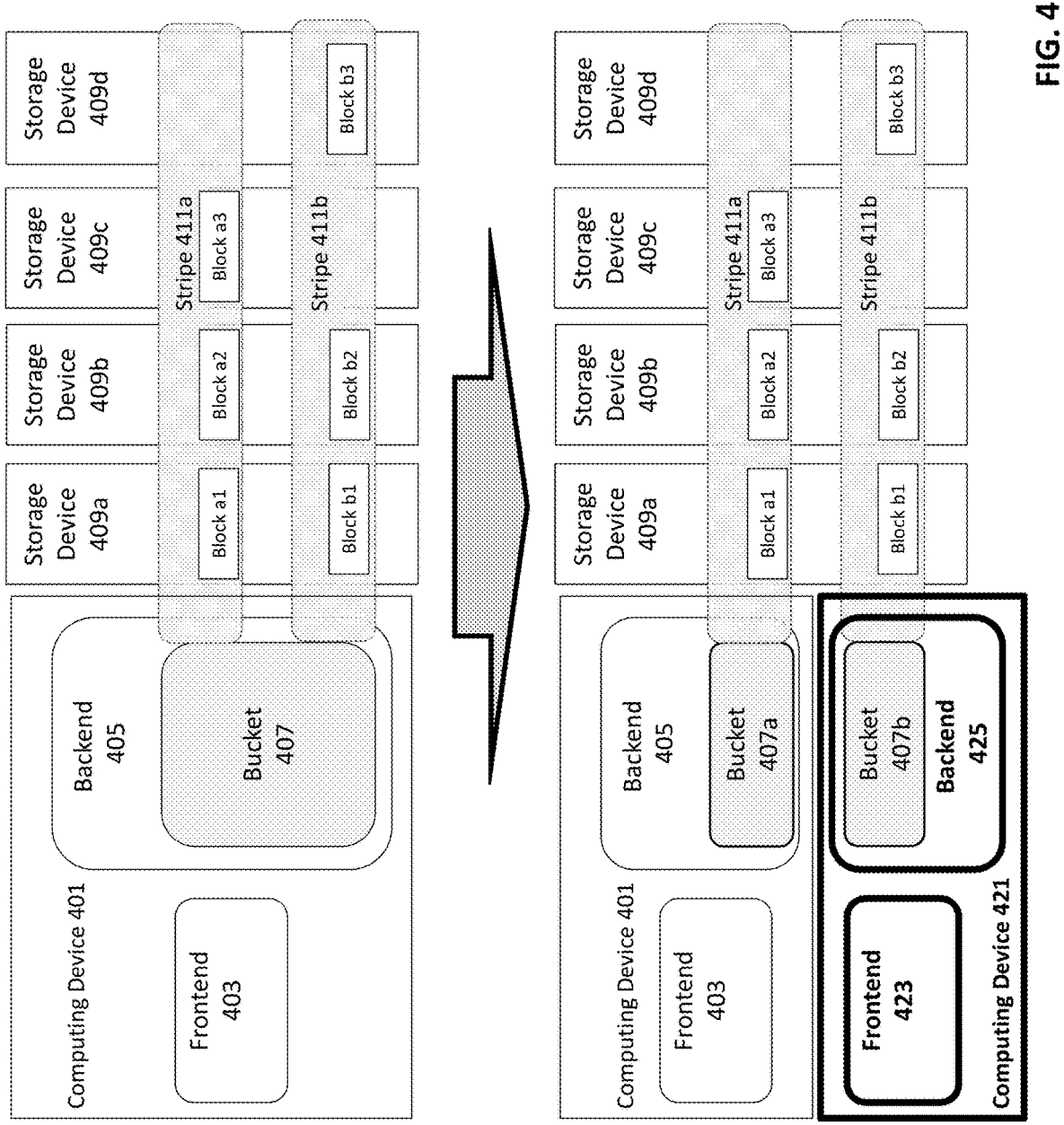
FIG. 4 illustrates an example of expanding processing power in a distributed filesystem in accordance with an example implementation of this disclosure.

FIG. 4 illustrates an example of expanding processing power in a distributed filesystem in accordance with an example implementation of this disclosure. The distributed filesystem initially comprises a computing device 401 (e.g., a server) and a plurality of storage devices 409a, 409b, 409c and 409d. The computing device 401 comprises a first frontend 403 and a first backend 405. The first backend 405 comprises at least one bucket 407. The plurality of storage devices 409a, 409b, 409c and 409d may comprise a plurality of solid-state devices. The plurality of storage devices 409a, 409b, 409c and 409d may be configured into a plurality of blocks, e.g., block a1, block a2, block a3, block b1, block b2 and block b3.

Each bucket in a backend is operable to build a failure resilient stripe comprising a plurality of blocks. For example, with 10 blocks, 8 blocks of data could be protected with 2 blocks of error protection/correction (i.e., using an 8+2 stripe). Likewise, with 10 failure domains, 6 blocks of data could be protected with 4 blocks of error protection/correction (i.e., using a 6+4 stripe).

For illustration, 4 storage devices and 2 stripes are described in FIG. 4. A different number of storage devices and stripes may be used without deviating from this disclosure. Bucket 407 is operable to build a plurality of failure resilient stripes 411a and 411b. The first failure resilient stripe 411a comprises block a1, block a2 and block a3. The second failure resilient stripe 411b comprises block b1, block b2 and block b3. Each storage block of the plurality of storage blocks in a particular failure resilient stripe may be located in a different storage device of the plurality of storage devices.

Bucket load balancing allows the cluster to be expanded. When a processing resource (e.g., computing device 421) is added to the filesystem, a new frontend 423 and new backend 425 may be generated. If the first backend 405 comprises at least two buckets, the first computing device is operable to transfer a bucket of the at least two buckets to a second backend 425 on a second computing device 421. If there are more buckets than backends, an existing bucket may be moved to a new backend.

As illustrated in FIG. 4, the first backend 405 initially comprises only one bucket 407. If the load on the filesystem reaches a state where there is only one bucket that becomes a hot-spot, the bucket may be split. The way to split a bucket starts with splitting the metadata space it manages in half (or quarters, or eighths), splitting the registry in half (or quarters or eighths), and splitting all the on-disk hashing stored in that registry in half (or quarters or eighths). This computation may be performed in RAM. Splitting in half or to smaller pieces (quarters or eighths) may be similarly difficult, so the filesystem might perform higher level splits to spare having to do iterative splitting. After a bucket is split, the new buckets may be load balanced to the new servers, while ensuring that each server holds about the same amount of computational load.

When additional buckets are required for new servers, computing device 401 is operable to split a bucket 407 on the first backend 405 into a first split bucket 407a and a second split bucket 407b. The first split bucket 407a may remain in the first backend 405. The second split bucket 407b may be transferred to the new backend 425 on the second computing device 421. The plurality of failure resilient stripes 411a and 411b associated with the bucket 407 on the first backend 405 is distributed among the first split bucket 407a and the second split bucket 407b.

Each bucket 407a and 407b is operable to build a new failure resilient stripe according to an available capacity of the plurality of storage devices 409a, 409b, 409c and 409d. The most recently added storage devices of the plurality of storage devices will typically be the least utilized and will, therefore, be selected for the new failure resilient stripes.

Figure 5:
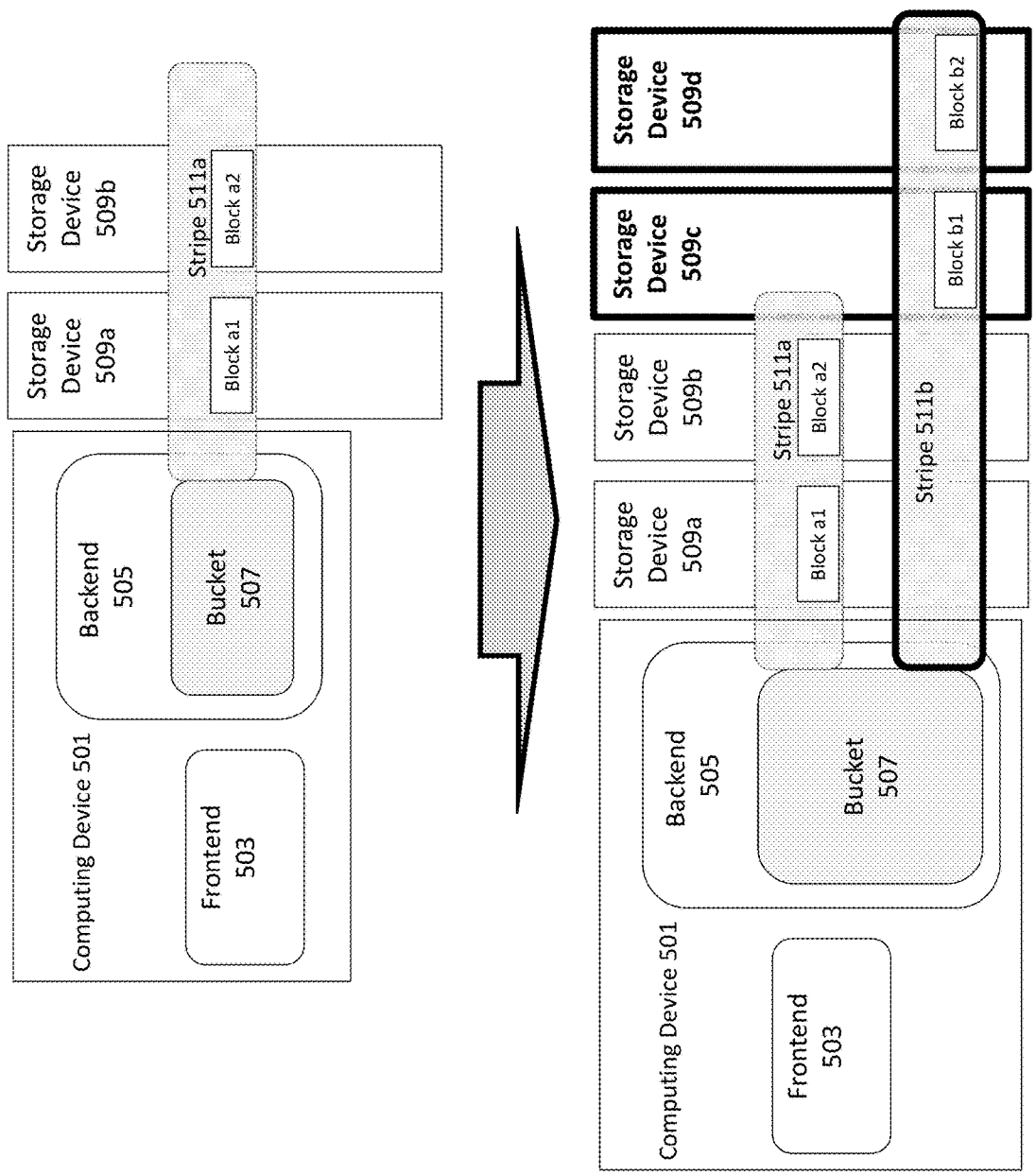
FIG. 5 illustrates an example of expanding storage capacity in a distributed filesystem in accordance with an example implementation of this disclosure.

FIG. 5 illustrates an example of expanding storage capacity in a distributed filesystem in accordance with an example implementation of this disclosure. The filesystem of FIG. 5 initially comprises a first computing device 501 and two storage devices 509a and 509b. The first computing device 501 comprises a frontend 503 and a backend 505. The backend 505 comprises a bucket 507 that is operable to build a failure resilient stripe 511a.

Two additional storage devices 509c and 509d are later added to the filesystem of FIG. 5. These most recently added storage devices 509c and 509d of the plurality of storage devices will typically be the least utilized and will, therefore, be selected for the new failure resilient stripe 511b. The filesystem determines/selects the blocks of a storage device according to the occupancy of the storage device.

When new SSDs are added and configured in their failure domains, the system may use the new SSDs for data placement. SSDs can be added on current servers or on new servers. New servers will also increase computational power.

Once the system adds the SSDs, it can start using them for new writes. The system will steer new writes to the new devices to distribute accesses across all devices, as most reads will come from current devices.

When older files are deleted or data is overridden, the older capacity is freed. The new SSDs will also be accessible for read requests. Once this happens, the automatic load balancing of the system will start steering writes back to the older SSDs.

A plurality of failure resilient stripes may be built using a bucket on a computing device such that each of the plurality of failure resilient stripes comprises a plurality of storage blocks and each of these storage blocks is located in a different storage device.

Figure 6:
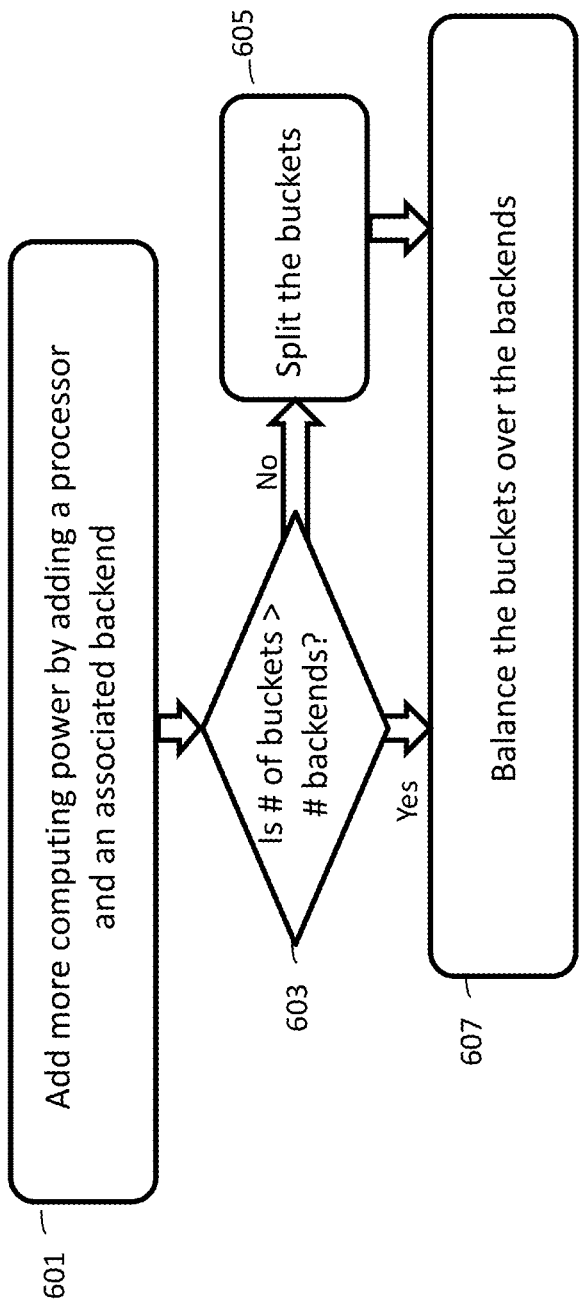
FIG. 6 is a flowchart illustrating an example method for expanding processing power in a distributed filesystem in accordance with an example implementation of this disclosure.

FIG. 6 is a flowchart illustrating an example method for expanding processing power in a distributed filesystem in accordance with an example implementation of this disclosure. In block 601, more computing power may be added by adding a new processor and/or server and an associated backend. In block 603, the number of buckets is compared to the number of backends. If the number of buckets exceeds the number of backends, an existing bucket may be moved into a new backend in block 607. For example if an existing computing device backend comprises at least two buckets, one of those buckets may be transferred to a new backend on a new computing device.

If the number of buckets does not exceed the number of backends, however, one or more existing bucket may be split into two or more new buckets in block 605. Once the number of buckets exceeds the number of backends as a result of splitting, a bucket may be moved into a new backend in block 607.

Figure 7:
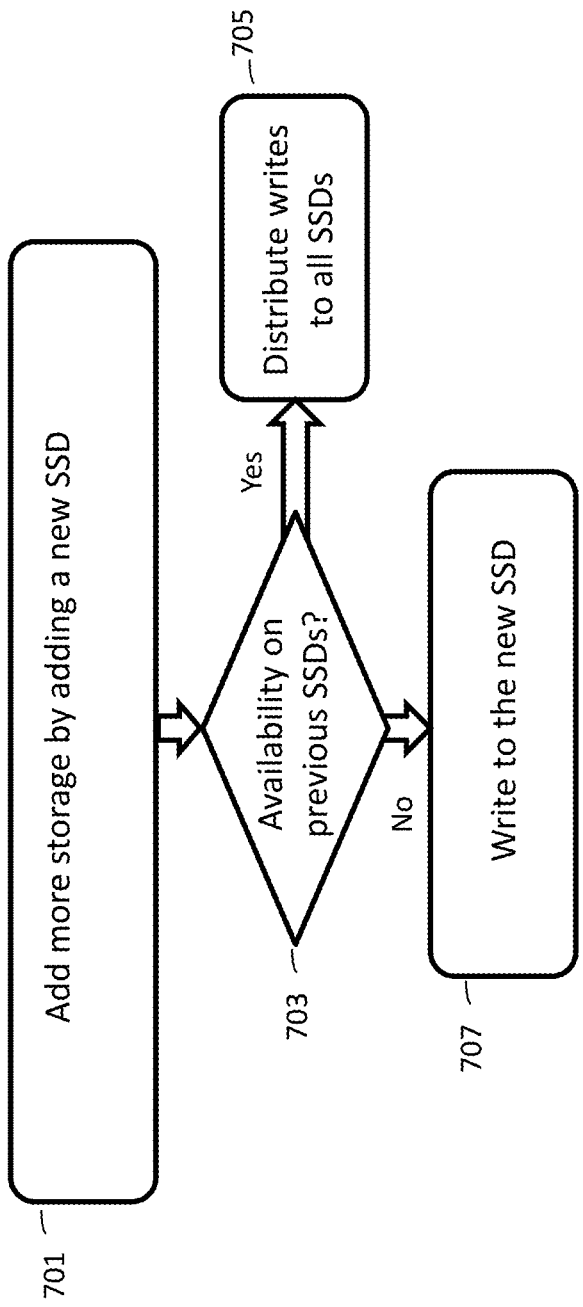
FIG. 7 is a flowchart illustrating an example method for expanding storage capacity in a distributed filesystem in accordance with an example implementation of this disclosure.

FIG. 7 is a flowchart illustrating an example method for expanding storage capacity in a distributed filesystem in accordance with an example implementation of this disclosure.

In block 701, more storage capacity is added to the filesystem by adding a new SSD. When a stripe is built, different storage devices are selected according to an available capacity of each storage device of a plurality of storage devices. The availability of SSDs is evaluated in block 703. If the previous SSDs are available, writes may be distributed to among all (newly-added and old) SSDs in block 705. When a storage device is unavailable, writes are directed to one or more newly-added SSDs in block 707.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
a first computing device comprising a first backend; and
a plurality of storage devices, wherein:
the first backend comprises one or more buckets,
the first computing device is operable to split a single bucket, located completely on the first backend of the first computing device, into two buckets,
each bucket of the one or more buckets is operable to build a failure resilient stripe, and
the first computing device is operable to transfer a bucket of the one or more buckets to a second backend on a second computing device.

2. The system of claim 1, wherein a bucket is operable to build a plurality of failure resilient stripes.

3. The system of claim 1, wherein the first computing device is operable to split a bucket on the first backend into three or more split buckets.

4. The system of claim 1, wherein each bucket on the first backend is operable to build a new failure resilient stripe, and wherein a most recently added storage device of the plurality of storage devices is selected for the new failure resilient stripe.

5. A system comprising:
a first computing device comprising a first backend; and
a plurality of storage devices, wherein:
the first backend comprises one or more buckets, the first computing device is operable to split a single bucket, located completely on the first backend of the first computing device, into two buckets,
each bucket of the one or more buckets is operable to build a failure resilient stripe that spans a group storage devices that are selected from the plurality of storage devices, and
a most recently added storage device of the plurality of storage devices is selected prior to an occupied storage device.

6. The system of claim 5, wherein the first computing device is operable to transfer a bucket of the one or more buckets to a second backend on a second computing device.

7. The system of claim 5, wherein a bucket is operable to build a plurality of failure resilient stripes.

8. The system of claim 5, wherein the first computing device is operable to split a bucket on the first backend into three or more split buckets.

9. A method comprising:

building a failure resilient stripe, using a bucket of a first computing device backend, such that the failure resilient stripes spans a group storage devices that are selected from the plurality of storage devices;

transferring the bucket to a second computing device backend; and splitting a single bucket, located completely on the first computing device, into two buckets.

10. The method of claim 9, wherein the method comprises building a plurality of failure resilient stripes using the bucket of the first computing device backend.

11. The method of claim 9, wherein the method comprises splitting the bucket on the first computing device backend into three or more split buckets.

12. The method of claim 9, wherein the method comprises:

selecting a most recently added storage device of the plurality of storage devices for a new failure resilient stripe; and building the new failure resilient stripe.

13. A method comprising:

forming a group of storage devices, on a first computing device, by selecting a storage device from a plurality of storage devices according to when the storage device was added to the plurality of storage devices;

building a failure resilient stripe that spans the group storage devices; and splitting a single bucket, located completely on the first computing device, into two buckets.

14. The method of claim 13, wherein the method comprises transferring the bucket to a second computing device.

15. The method of claim 13, wherein the method comprises building a plurality of failure resilient stripes using the bucket.

16. The method of claim 13, wherein the first computing device is operable to split a bucket into three or more split buckets.

* * * * *